United States Patent [19]

Hudson

[11] Patent Number: 5,522,664
[45] Date of Patent: Jun. 4, 1996

[54] SLIDE ASSEMBLY

[75] Inventor: Ray Hudson, Glapwell, United Kingdom

[73] Assignee: Eastman Machine Company Limited, Chesterfield, United Kingdom

[21] Appl. No.: 244,882

[22] PCT Filed: Dec. 11, 1992

[86] PCT No.: PCT/GB92/02305

§ 371 Date: Jul. 14, 1994

§ 102(e) Date: Jul. 14, 1994

[87] PCT Pub. No.: WO93/12401

PCT Pub. Date: Jun. 24, 1993

[30] Foreign Application Priority Data

Dec. 13, 1991 [GB] United Kingdom ............... 9126472

[51] Int. Cl.⁶ .................................................. F16C 32/06

[52] U.S. Cl. .................... 384/8; 384/12; 384/37; 384/38; 384/40

[58] Field of Search ....................... 384/12, 37, 38, 384/40, 41, 8

[56] References Cited

U.S. PATENT DOCUMENTS 5,391,002  2/1995  Eigenbrod ........................... 384/12
5,431,527  7/1995  Yamazaki ........................... 384/12

FOREIGN PATENT DOCUMENTS 0285453  5/1988  European Pat. Off. .

Primary Examiner—Lenard A. Footland
Attorney, Agent, or Firm—Sughrue, Mion, Zinn, Macpeak & Seas

[57] ABSTRACT

The present invention relates to an assembly, especially an assembly which provides precision guidance of a lighting member.

12 Claims, 1 Drawing Sheet

SLIDE ASSEMBLY

BACKGROUND OF THE INVENTION

The present invention relates to a slide assembly, especially an assembly which provides precision guidance of a sliding member.

Highly accurate and low-friction guidance of sliding elongate members is necessary in many different types of machines or instruments, of which a three-dimensional co-ordinate measuring machine can be considered to be a representative example. Co-ordinate measuring requires movement of a measuring element relative to a stationary article, for example a sensor probe which contacts the article, and recording the movement of the element in relation to a reference point so as to build up a two-dimensional or three-dimensional measurement profile of the article. In a typical construction of such a measuring machine, a probe is carried by a square-, oblong- or circular-section spindle which is mounted in a carriage on a bridge movable relative to a support table for the article. Movement of the probe in the Z axis direction is by way of axial displacement of the spindle in a bearing mount on the carriage, movement in the Y axis direction is by way of displacement of the carriage on the bridge and movement in the X axis direction is by way of displacement of the bridge over the table. The accuracy of the measurements obtained from signals generated through co-operation of the probe with the article is critically dependent on the accuracy of the spindle displacement, in particular its travel along a precisely fixed axis. Any deviations from this axis will ultimately be reflected in the measurement result.

In order to ensure precise and low-friction guidance of the spindle in such a measuring machine, it is common practice to construct the bearing mount for the spindle as an air bearing sleeve encasing a portion of the spindle. The peripheral surface of the spindle and the guide passage of the sleeve must be finished to a superaccurate standard of parallelism and uniformity of section, which imposes substantial costs on manufacturing of the assembly. Problems that can result from machining of the spindle surface and sleeve passage are local fluctuations in diameter or width and also gradual change resulting in a taper. If there are any such departures of the spindle and bore diameters or widths from their nominal values the spindle displacement in the sleeve may deviate from a fixed axis.

SUMMARY OF THE INVENTION

It is therefore the principal object of the invention to provide a slide assembly in which highly accurate guidance of an axially displaceable member may be achieved by more economically producible measures. A further object of the invention is to provide an assembly which includes an adjustment facility allowing precise setting of the guidance of the member.

Other objects and advantages of the invention will be apparent from the following description.

According to the present invention there is provided a slide assembly comprising an axially displaceable member, and guidance means for guiding displacement of the member and comprising at least one set of air bearings which are co-operable with the peripheral surface of the member and mutually aligned in a common transverse plane of the member, wherein the bearings of the or each set are substantially equidistantly spaced around the periphery of the member and are each held by resilient mounting means.

Due to the substantially equidistantly spacing of the air bearing of the or each set around the periphery of the member and the disposition of the bearings to be symmetrical about a transverse plane of the member, each being arranged so that the bearing force it exerts, by way of a compressed air film, on the surface of the member is opposed by the force exerted by another bearing of that set or the resultant force of two or more bearings of that set. Any changes in the diameter or width of the member due to production tolerances can be absorbed by equal deflection of the resilient mounting means for all bearings of the set without deviation of the displacement of the member from a fixed axis. It is particularly convenient if the or each set comprises two pairs of bearings, with the bearings of each pair being disposed diametrically opposite to each other and the pairs at right angles to each other. However, if so desired and depending on the cross-sectional shape of the spindle, a set can comprise just one pair of bearings or an uneven number of bearings such as three or five.

The resilient mounting means can comprise, for example, a spring element, an elastomeric element or a pneumatic element.

It is of particular advantage if the assembly includes adjusting means to adjust the bearings relative to the peripheral surface of the member. Thus, if the resilient mounting means are arranged to press the bearings against the surface, the adjusting means can be operable to vary the force exerted on the bearings by the resilient mountings means. Such an adjustment allows the forces to be matched in appropriate manner around the circumference to the member and the member to be aligned as desired.

The air pressures between the bearings and the member can be conveniently matched if the assembly includes duct means for supplying compressed air to the bearings from a single feed.

The bearings can be mounted by the resilient mounting means on, for example, a frame enclosing the member, which results in a compact arrangement able to be mounted as a unit on, for example, a carriage of a co-ordinate measuring machine. When the assembly is intended for use in such a machine, the member, which can be cylindrical, can be provided at one end with a measuring probe, a camera or other device. The member can, if desired, also be mounted to be rotatable.

BRIEF DESCRIPTION OF THE DRAWINGS

An embodiment of the present invention will now be more particularly described with reference to the accompanying drawings, in which.

DETAILED DESCRIPTION OF THE PREFERRED EMBODIMENT

Figure 1:
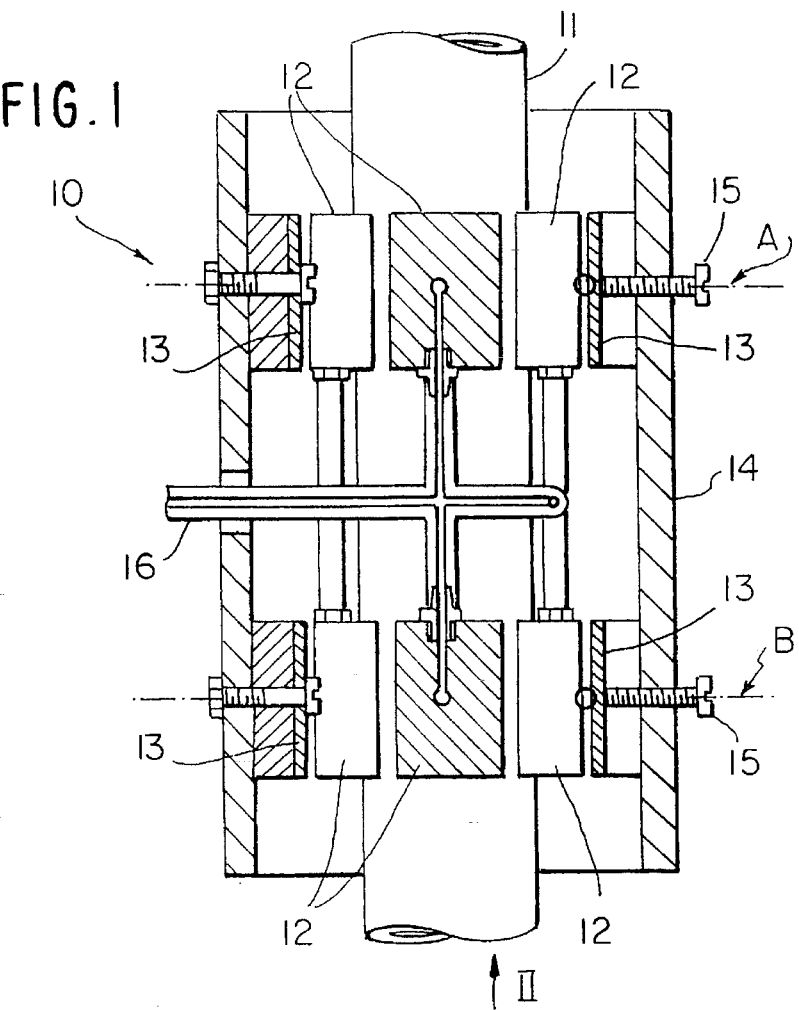
FIG. 1 is schematic sectional elevation, along the line I—I in FIG. 2, of a slide assembly embodying the invention.

Referring now to the drawings there is shown a slide assembly 10 which, in this particular embodiment, is intended to be mounted on a sliding carriage of a co-ordinate measuring machine, the travel of the carriage representing movement in one co-ordinate measurement direction. The assembly 10 comprises an axially displaceable, and optionally also rotatable, hollow cylindrical spindle 11 which is provided at its lower end with a sensor probe (not shown) and coupled at its upper end to drive means (not shown) for effecting axial displacement, and also rotation if appropriate, of the spindle. The axial displacement of the spindle represents movement in another co-ordinate measurement direction. The probe can be brought into alignment with selected points on the contour of an article to be measured and signals that are produced whenever the probe is activated can be evaluated to enable calculation of the dimensions of the article. The actual operation of the machine does not form part of the invention and is not described in further detail.

Guidance of the axial displacement of the spindle 11 is provided by two sets of air bearings 12 which are co-operable with the circumferential surface of the spindle. The two sets are spaced apart in the axial direction of the spindle and the bearings of each set are disposed to be symmetrical about a respective transverse plane of the spindle. The planes are designated A and B in FIG. 1.

Figure 2:
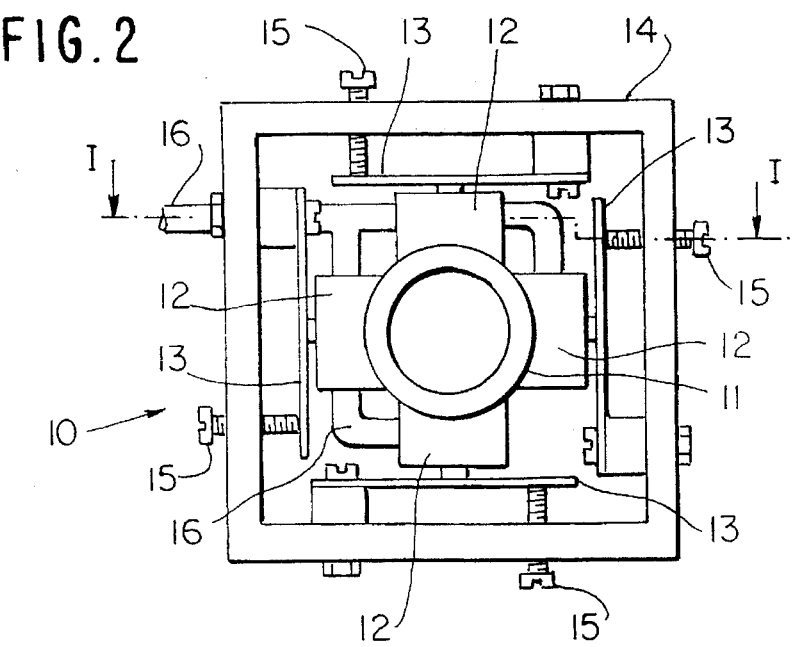
FIG. 2 is an underneath view of the assembly in the direction of arrow II in FIG. 1.

The bearings 12 of each set are equidistantly spaced around the circumference of the spindle and each set consists of two pairs of bearings, the bearings of each pair being diametrically opposite to each other and the two pairs being at right angles to each other. The bearing surface of each bearing is complementary in shape to the adjacent portion of the spindle surface and, as can be seen from FIG. 2, the total area of the bearing surfaces of the bearings of each set is sufficient to provide support for about 300° or more of the spindle circumference.

Each of the bearing 12 is pivotably connected by a spherical joint to a respective resilient mounting element in the form of a leaf spring 13, the connection being intermediate the ends of the spring. Each leaf spring 13 is mounted at one of its ends by a mounting block on a square-section frame 14 which encloses the spindle 11. Associated with each leaf spring 13 is an adjusting screw 15 which is threadly engaged in the frame and bears on the end of the spring remote from its mounting block. The arrangement of the leaf springs 13 and adjusting screws 15 is such that the bearings 12 are pressed against the surface of the spindle by a force which is individually settable for the bearings by way of the screws 15.

Compressed air for operation of the bearings 12 is supplied by way of a pipe system 16 with a single inlet feed. The pipe system includes branch ducts leading to all of the bearing.

In use of the assembly, compressed air is supplied at a pressure of, for example, 40–80 pounds per square inch through the pipe system 16 to each of the air bearings 12, where it escapes to provide a pressure air film between that bearing and the circumferential surface of the spindle 11. The thickness of the air film will depend on the selected tolerances and may be, for example, in the region of 5 microns. To accurately set the bearings so that the axial displacement of the spindle follows a fixed axis, the adjusting screws 15 of one set of bearings are operated until the spring force exerted on each bearing gives the required locating force, which is equal to the pneumatic force exerted by the bearing on the spindle surface, and so that the oppositely directed forces exerted on the spindle by the bearings of each pair are equal. A similar adjustment is then performed with the adjusting screws 15 of the other set of bearings. When these adjustments have been completed, the displacement of the spindle will be constrained to follow a fixed line represented by the spindle axis. Any departures from the nominal diameter of the spindle, whether in the form of annular concavities or convexities or possibly a taper, are absorbed by the resilient mounting of the bearings, in particular through equal deflection of the leaf springs of each bearing set with respect to the spindle axis. Since the bearings of each set move in unison when changes in the spindle diameter are encountered, the spindle displacement does not deviate from its set path. The movements of the bearings caused by leaf spring deflection are imperceptible and the tolerances compensated for by the spring suspension of the bearings may be little more than a few microns, depending on the machining accuracy of the spindle. The pivotal mounting of the bearings on the leaf springs allows self-alignment of the bearings to accommodate similar tolerances.

The guidance system described above provides low-friction precision guidance of the spindle and permits substantially more economic construction of the assembly than would be the case if bearing support for the spindle was by way of an air bearing sleeve with a supperaccurately finished bore. An assembly of this kind is particularly suitable for use in a co-ordinate measuring machine, but is equally applicable to any apparatus or instrument in which highly accurate guidance of a sliding component such as rod or spindle is required, whether the member is of circular, elliptical or polygonal cross-section.

I claim:

1. A slide assembly comprising an axially displaceable member and guidance means for guiding displacement of the member, wherein the guidance means comprises at least one set of air bearings which are co-operable with the peripheral surface of the member and mutually aligned in a common transverse plane of the member, and wherein the bearings of the or each set are substantially equidistantly spaced around the periphery of the member and are each held by resilient mounting means.

2. A slide assembly as claimed in claim 1, wherein the or each set of air bearings comprises two pairs of bearings, the bearings of each pair being disposed diametrically opposite to each other and the pairs being disposed at right angles to each other.

3. A slide assembly as claimed in claim 1, wherein the resilient mounting means comprises a spring element.

4. A slide assembly as claimed in claim 1, wherein the resilient mounting means comprises an elastomeric element.

5. A slide assembly as claimed in claim 1, wherein the resilient mounting means comprises a pneumatic element.

6. A slide assembly as claimed in claim 1, comprising adjusting means to adjust the bearings relative to the peripheral surface of the member.

7. A slide assembly as claimed in claim 6, wherein the resilient mounting means are arranged to press the bearings against the peripheral surface of the member and the adjusting means are operable to vary the force exerted on the bearings by the resilient mounting means.

8. A slide assembly as claimed in claim 1, comprising duct means for supplying compressed air to the bearings from a single feed.

9. A slide assembly as claimed in claim 1, wherein the bearings are mounted by the resilient mounting means on a frame enclosing the member.

10. A slide assembly as claimed in claim 1, wherein the member is cylindrical.

11. A slide assembly as claimed in claim 10, wherein the member is additionally mounted to be rotatable.

12. A slide assembly as claimed in claim 1, wherein the spindle is provided at one end with a measuring probe.

* * * * *